United States Patent [19]
Maatta et al.

[11] Patent Number: 5,768,370
[45] Date of Patent: Jun. 16, 1998

[54] USER CHANGEABLE COSMETIC PHONE INTERFACE

[75] Inventors: Veli-Matti Maatta, Turku, Finland; Gregor Daniel Magnusson, Newbury Park; Frank Nuovo, Los Angeles, both of Calif.

[73] Assignee: Nokia Mobile Phones, Ltd., Salo, Finland

[21] Appl. No.: 780,215

[22] Filed: Jan. 8, 1997

[51] Int. Cl.[6] ..................................................... H04M 1/00
[52] U.S. Cl. ........................................... 379/433; 379/434
[58] Field of Search ..................................... 379/433, 428, 379/434; 455/90, 555

[56] References Cited

U.S. PATENT DOCUMENTS

| | | | |
|---|---|---|---|
| 3,838,229 | 9/1974 | Morrell et al. | 179/100 D |
| 4,292,481 | 9/1981 | Barnes et al. | 179/178 |
| 5,023,936 | 6/1991 | Szczutkowski et al. | 455/90 |
| 5,546,457 | 8/1996 | Tomura et al. | 379/428 |

FOREIGN PATENT DOCUMENTS

| | | |
|---|---|---|
| 0 351 863 A2 | 7/1989 | European Pat. Off. . |
| 2252219 | 1/1991 | United Kingdom . |

*Primary Examiner*—Jack Chiang
*Attorney, Agent, or Firm*—Perman & Green, LLP

[57] ABSTRACT

A display system provides a portable telephone with a plurality of distinctive appearances. An overlying cover is removably attachable to a telephone housing which includes operating buttons and an indicia panel. The cover has a primary opening for viewing the indicia panel and secondary openings for free reception therethrough of the operating buttons. A transparent window member includes a first peripheral edge encompassing the outer face and a first recessed peripheral ledge projecting outwardly to a terminal peripheral edge. A collar removably attachable to the cover has an aperture similar in size and shape to the primary opening of the cover and an inner surface with an inner peripheral recess adjacent the aperture for capturing reception of the peripheral ledge of the transparent window member between the collar and the cover so that the transparent window member overlies the indicia panel on the housing. A second outer peripheral edge on the collar defines the extent of the outer face and a second outwardly projecting peripheral ledge is recessed with respect to the outer face thereof. In turn, a fixing collar is removably attachable to the cover and has an aperture sized and shaped for contiguously encompassing the second outer peripheral edge of the collar when attached to the cover and has an inner peripheral recess adjacent the aperture for capturing reception of the second peripheral ledge of the collar between the collar and the cover. The cover, window member, collar and fixing collar may all have distinctive colors.

10 Claims, 4 Drawing Sheets

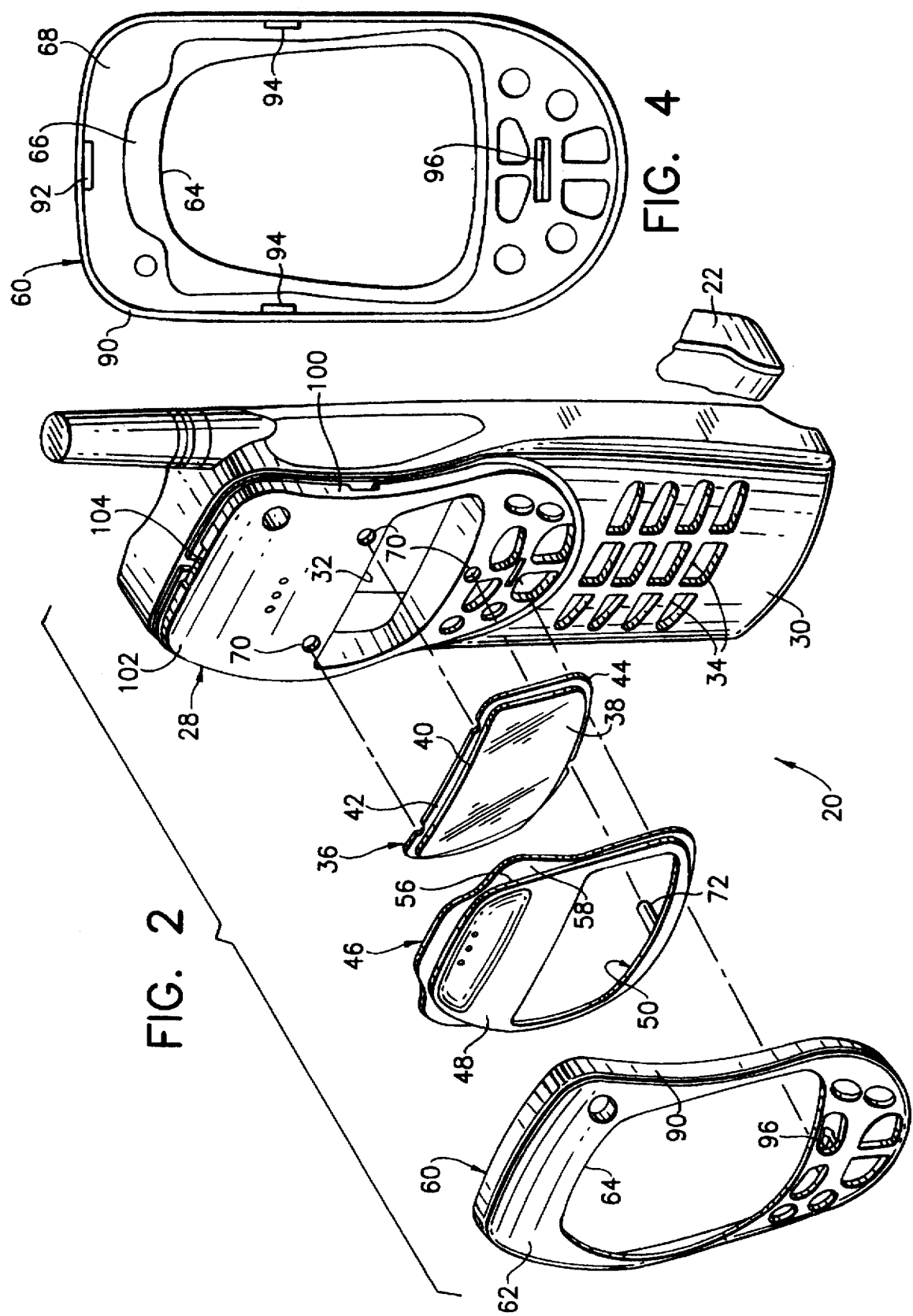

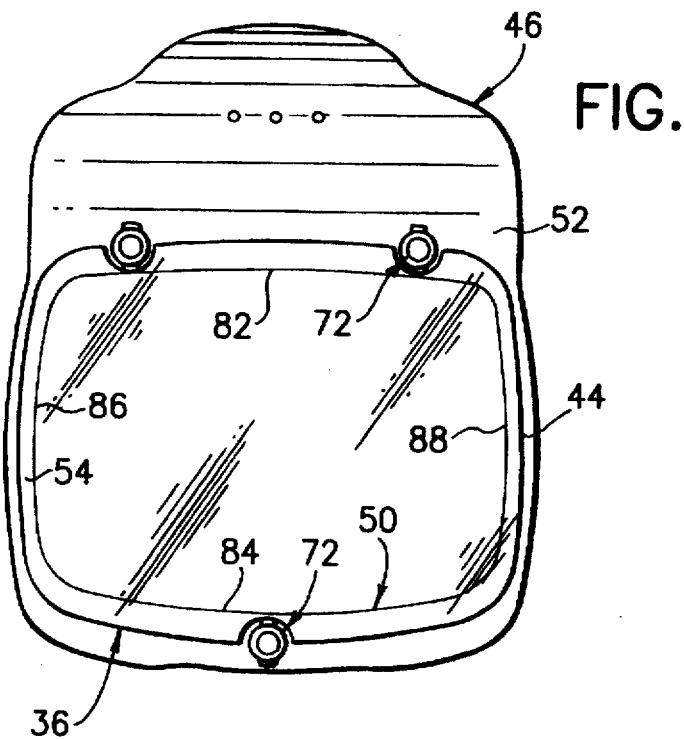
FIG. 3
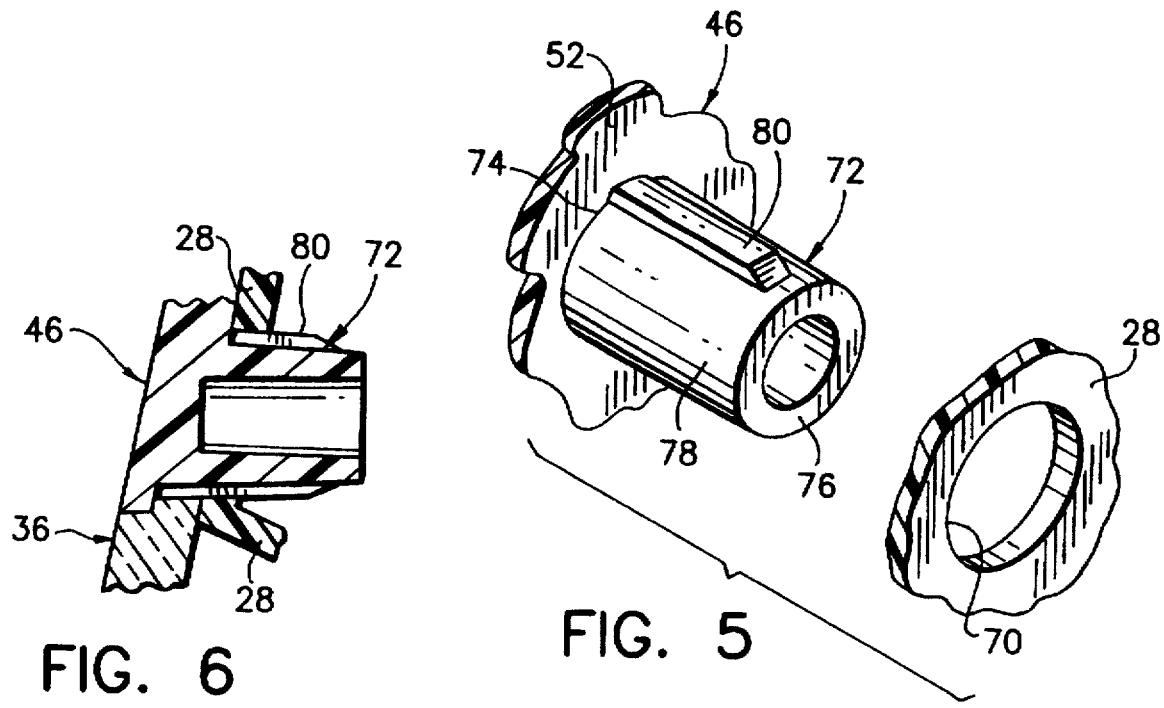
FIG. 6
FIG. 5

USER CHANGEABLE COSMETIC PHONE INTERFACE

BACKGROUND OF THE INVENTION

1. Field of the Invention

The present invention relates generally to portable telephones and more particularly to a portable telephone adapted to accommodate a plurality of distinctive telephone appearances.

Throughout this disclosure, reference to the term "color" when describing the invention will be taken to include shades of color, texture, and other surface differences of a component such that a viewer can readily distinguish one component from another by its surface appearance.

2. Description of the Prior Art

Portable telephones are generally well known in the art and include radiotelephones, such as cellular radiotelephones, cordless radiotelephones and personal communicators. Portable telephones traditionally communicate with a remote base station to provide wireless communications for a user. Portable telephones have become a widely accepted form of wireless communications in the home cordless and cellular radiotelephone markets and are rapidly finding applications into new types of communication systems, such as personal communication systems (PCS).

Because of such wide acceptance both within and among the communication systems, distinguishing the appearance of portable telephones has become an important need for the customer, the manufacturer and the distributor of the portable telephone. Customers desire a distinguished appearance to meet their personal tastes and preferences. Manufacturers desire a distinguished appearance to provide a variety of telephone appearances to their customers as well as to provide a distinguished appearance for the manufacturer's own product. Distributors desire a distinguished appearance to distinguish themselves in the marketplace from each other to promote their name brand. The desires of all manufacturers, sellers and users to have a distinguished looking portable telephone are eventually communicated to the manufacturer so that the particular distinguished looking portable telephone can be produced.

A portable telephone is conventionally produced by assembling telephone circuitry, including transceiver circuitry and user interface circuitry, within a housing. The user interface circuitry includes a display, a keypad, an earpiece and a microphone. The housing traditionally include a back housing, having a standard molded form, mated to a front housing having a distinguished appearance. The front housing is adapted to provide a variety of distinguished looks by varying its molded contour, texture or color. Typically, the user interface elements are mounted inside the front housing and electrically connected to transceiver circuitry mounted in the back housing. The display and keypad may also each have a distinguished appearance. A distinguished looking front housing, a distinguished looking display and a distinguished looking keypad are selected to create one of a number of appearance combinations thereby giving the portable telephone an overall distinguished appearance.

A disadvantage of conventionally producing the distinguished appearances of portable telephones is that the distinguished appearance of a particular portable telephone must be known by the manufacturer before the portable telephone is manufactured. At selected locations throughout a production line, the appropriate front housing, keypad and display, and the like, are assembled appropriately to produce the appropriate distinguished appearance for the portable telephone. While this manufacturing technique was acceptable in the past when relatively few distinguished appearances for portable telephones were needed, the large growth in the telecommunications industry has created a demand for a very large number of distinguished appearances for portable telephones. Today a typical manufacturer may be required to track literally hundreds of portable telephone models, each having a unique look. The task of managing such a demand has prompted the need for a new way to manufacture portable telephones to achieve a variety of distinguished appearances that meet the market demand without burdening the production flow.

Furthermore, conventionally produced portable telephones do not generally permit the user of the portable telephone to alter the appearance of the portable telephone once manufactured or purchased. After market companies have tried to meet customers' needs for their own unique look by providing accessories, such as cases for holding the portable telephones. However, these cases are clumsy, add weight, and have a limited effect on the appearance of the portable telephone.

Accordingly, there is a need for a portable telephone adapted to accommodate a plurality of distinctive telephone appearances that overcomes the disadvantages of conventionally produced portable telephones. A number of patents and publications typify the prior art in this regard. For example, according to the disclosure in U.S. Pat. No. 5,023,936 to Szczutkowski, the same basic transceiver unit is used for several different transceiver feature configurations. This basic transceiver unit typically may provide all of the software controlled features and functions of the "top of the line" unit and thus provides a superset of the features and functions provided by the other transceiver models. This basic transceiver also provides a mechanism for substantially irreversibly selecting a subset of the total features provided by the basic transceiver unit, this selection mechanism preferably being operable from outside of the transceiver case. Once made, the selection is preferably difficult or substantially impossible to reverse. This prevents a purchaser from easily defeating the selection in an attempt to enable additional transceiver functions. In a preferred embodiment, holes are cut through the front panel of the transceiver in registry with associated underlying printed circuit board pathways. To irreversibly disable certain transceiver functions, it is necessary only to sever the pathways. Severing the pathways does not destroy hardware functionality in the preferred embodiment, but instead disables performance of certain portions of the transceiver microprocessor software programming advanced or optional features.

U.S. Pat. No. 4,292,481 to Barnes et al. discloses a decorative applique having a profile corresponding to that of the faceplate of a standard pushbutton telephone. That is, the applique has plural openings therein positioned to overlie the corresponding pushbutton openings in the faceplate. The upper surface of the applique is provided with any desired decorative design in the form of colors, fanciful designs, abstract patterns, and combinations of these so as to match the decor of a home or office in which the telephone is placed. The undersurface of the applique is preferably provided with pressure sensitive adhesive to enable its ready attachment to the telephone faceplate. U.S. Pat. No. 3,838,229 to Morrell et al. discloses a removable cover for a telephone unit which clips into place and is easily and quickly removable by service personnel. The cover may be provided in a variety of configurations such that the cover can be changed to accommodate different dial forms and other aperture arrangements. The cover may also be provided in a variety of colors.

UK Patent Application GB 2 252 219 discloses a telephone set in which the hand-held receiver has a slotted region in its upper surface formed with a grid of cells, a plurality of colored ornamental elements selectively placed in the cells to make patterns, pictures, numbers or characters for exhibition, and a transparent cover plate for removable placement over the slotted region.

As disclosed in UK Patent Application GB 2 293 517, a portable telephone is adapted to accommodate a plurality of distinctive telephone appearances. The telephone includes a housing having a distinctive appearance adapted to receive a faceplate as one of a plurality of faceplates to provide an even more distinctive user interface appearance. The faceplate is advantageously attached to the housing after a functional portable telephone is produced to streamline manufacturing and offer a greater variety of unique appearances for the telephone.

It was in light of the foregoing that the present invention was conceived and has now been reduced to practice.

SUMMARY OF THE INVENTION

The present invention relates to a display system which provides a portable telephone with a plurality of distinctive appearances. An overlying cover is removably attachable to a telephone housing which includes operating buttons and an indicia panel. The cover has a primary opening for viewing the indicia panel and secondary openings for free reception therethrough of the operating buttons. A transparent window member includes a first peripheral edge encompassing the outer face and a first recessed peripheral ledge projecting outwardly to a terminal peripheral edge. A collar removably attachable to the cover has an aperture similar in size and shape to the primary opening of the cover and an inner surface with an inner peripheral recess adjacent the aperture for capturing reception of the peripheral ledge of the transparent window member between the collar and the cover so that the transparent window member overlies the indicia panel on the housing. A second outer peripheral edge on the collar defines the extent of the outer face and a second outwardly projecting peripheral ledge is recessed with respect to the outer face thereof. In turn, a fixing collar is removably attachable to the cover and has an aperture sized and shaped for contiguously encompassing the second outer peripheral edge of the collar when attached to the cover and has an inner peripheral recess adjacent the aperture for capturing reception of the second peripheral ledge of the collar between the collar and the cover. The cover, window member, collar and fixing collar may all have distinctive colors.

In short, the invention is about changeable collars and a changeable window for creating new images of the phone. The collars are to be changed easily without special tools. Only a small screwdriver, small coin or other comparable item may be needed, all of which are available to the user in a home environment. Major advantages of the invention over current phones include the following:

the phone image or appearance can be quickly altered, for example, to coordinate with the clothing worn by the user;

the new phone image or appearance is relatively inexpensive;

the window member on the face of the phone can be easily changed when damaged.

The assembly of the invention is held together by means of a fixing collar which is attached to the phone housing with snap fittings. In sequence, first the window member and the collar are mated, then this subassembly is attached to the housing and maintained in place by the overlying fixing collar.

Accordingly, a primary feature of the present invention is to provide a portable telephone adapted to accommodate a plurality of distinctive telephone appearances.

Another feature of the invention is to provide such a portable telephone with a housing of one distinctive color, a window member of another distinctive color, a collar associated with the window member having still another distinctive color, and an overlying fixing collar having yet another distinctive color, all of these components being readily assembled and disassembled.

Still another feature of the present invention is to provide such a portable telephone in which a cover having a first distinctive color is removably attachable to a housing containing components including a plurality of operating buttons for the operation of the telephone and an indicia panel for displaying information concerning operation of the telephone encloses the components within the housing and includes an outer face having a primary opening for viewing the indicia panel on the housing and a plurality of secondary openings for free reception therethrough of the operating buttons, and including a transparent window member having an outer face with a first peripheral edge encompassing the outer face and a first peripheral ledge recessed with respect to the outer face thereof and projecting outwardly therefrom to a terminal peripheral edge, and including a collar removably attachable to the cover having an outer face with an aperture similar in size and shape to the primary opening of the cover and an inner surface having an inner peripheral recess adjacent the aperture for capturing reception of the peripheral ledge of the transparent window member between the collar and the cover when attached to the cover so that the transparent window member overlies coextensively the indicia panel on the housing, the collar further including a second outer peripheral edge defining the extent of the outer face and a second peripheral ledge recessed with respect to the outer face thereof and projecting outwardly therefrom, the collar having a second distinctive color, and including a fixing collar removably attachable to the cover, the fixing collar including an outer face having an aperture sized and shaped for contiguously encompassing the second outer peripheral edge of the collar when attached to the cover, and having an inner peripheral recess adjacent the aperture for capturing reception of the second peripheral ledge of the collar between the collar and the cover, the fixing collar having a third distinctive color.

A further feature of the present invention is to provide such a portable telephone in which the window member has a fourth distinctive color.

Yet a further feature of the present invention is to provide such a portable telephone in which the cover, transparent window member, collar and fixing collar can all be easily and readily assembled and disassembled but remain in the assembled condition during normal usage.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

BRIEF DESCRIPTION OF THE DRAWINGS

FIG. 2 is an exploded perspective view of the invention illustrated in FIG. 1;

FIG. 3 is a bottom plan view of two components of the invention illustrated in FIG. 2 in their assembled condition;

FIG. 4 is a bottom plan view of another component of the invention illustrated in FIG. 2;

FIG. 5 is a detail exploded view of two of the components of the invention illustrated in FIG. 2, about to be assembled;

FIG. 6 is a detail cross section view of the components illustrated in FIG. 5 in their assembled condition;

DETAILED DESCRIPTION OF THE PREFERRED EMBODIMENT

Figure 1:
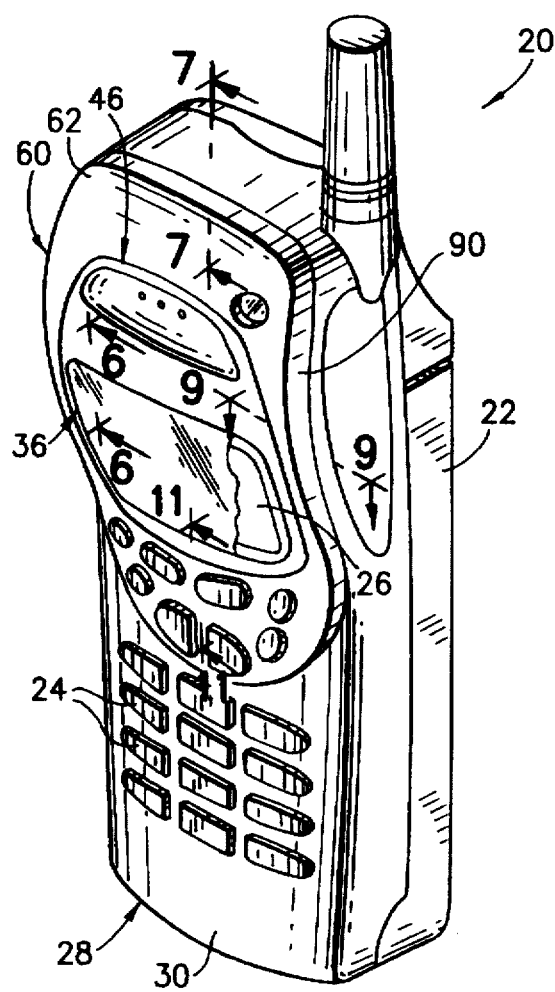
FIG. 1 is a perspective view of a portable telephone embodying the invention.
Figure 7:
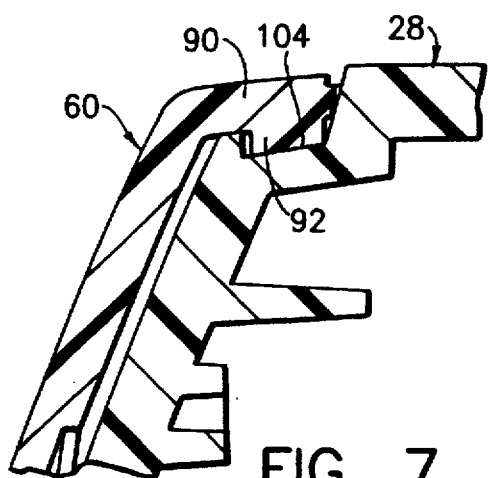
FIG. 7 is a detail cross section view taken generally along line 7—7 in FIG. 1.
Figure 8:
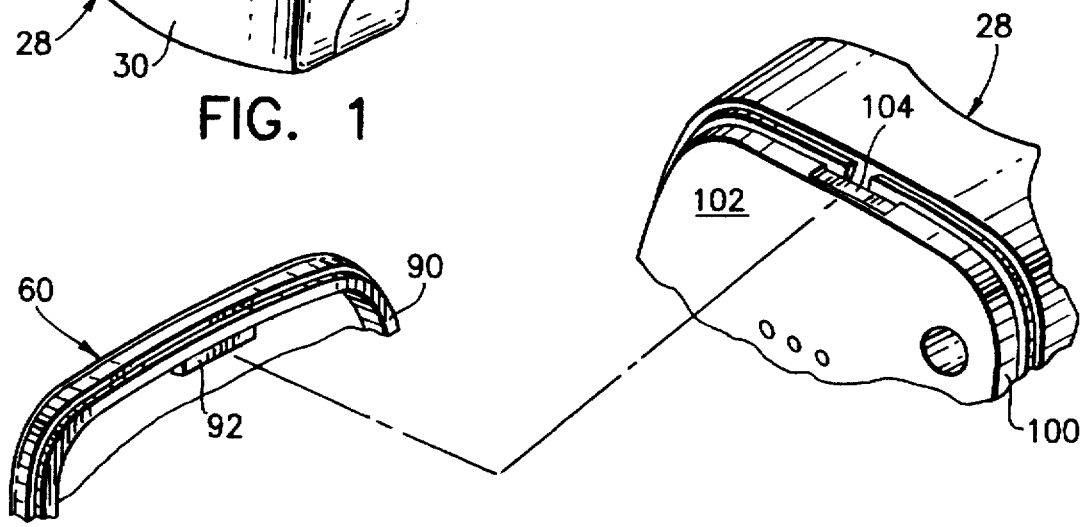
FIG. 8 is a detail perspective exploded view of a pair of components of the invention illustrated in FIG. 2, about to be assembled.
Figure 11:
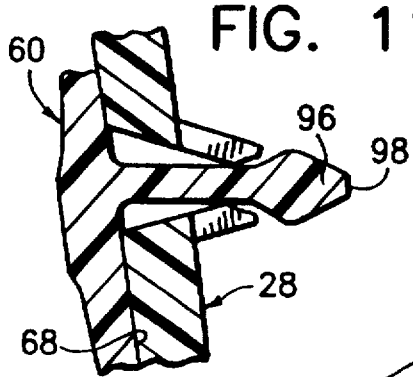
FIG. 11 is a detail cross section view of the components illustrated in FIG. 10 in their assembled condition.
Figure 10:
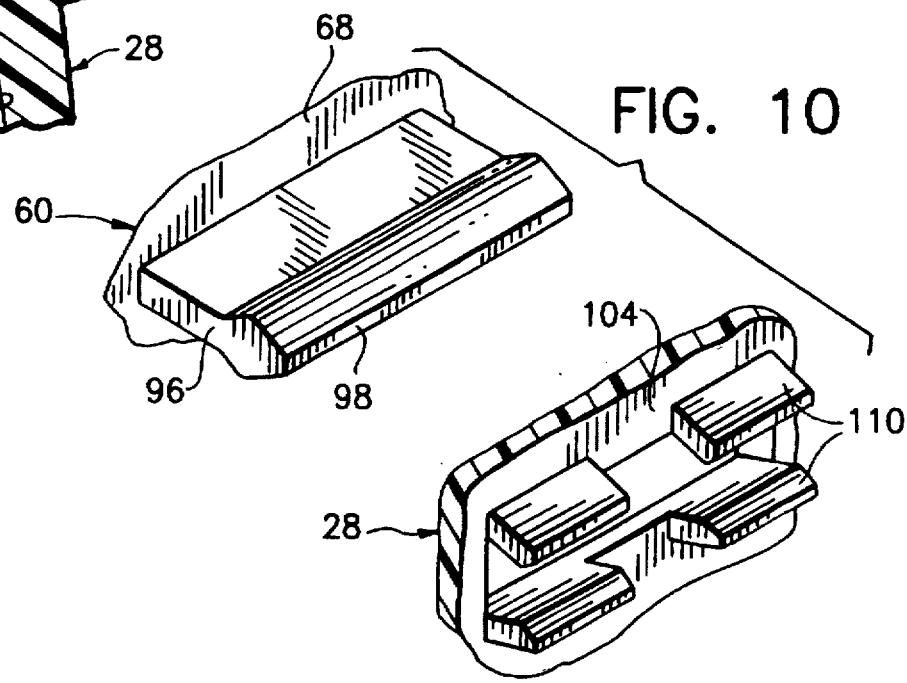
FIG. 10 is a detail perspective exploded view of another pair of components of the invention illustrated in FIG. 2, about to be assembled.
Figure 9:
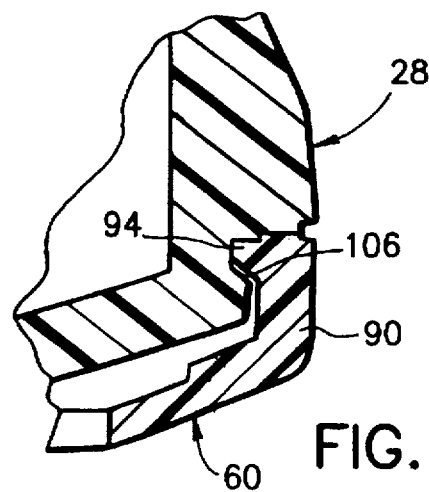
FIG. 9 is a detail cross section view taken generally along line 9—9 in FIG. 1.

Turn now to the drawings and, initially, to FIGS. 1 and 2 which generally illustrates a portable telephone 20 embodying the invention. More specifically, the telephone 20 incorporates a display system to enable it to present a plurality of distinctive appearances.

In a customary fashion, the telephone 20 includes a housing 22 containing all of the functional components which enable communications to take place. These functional components include, among numerous others, a plurality of operating buttons 24 for the operation of the telephone and an indicia panel 26 for displaying information concerning operation of the telephone. A cover 28 is coextensive with and overlies the housing 22 and is removably attachable to the housing so as to complete closure of the components within the housing. The cover 28 includes an outer face 30 having a primary opening 32 (FIG. 2) for viewing the indicia panel 26 on the housing 22 and a plurality of secondary openings 34 for free reception therethrough of the operating buttons 24. The cover 28 displays a first distinctive color.

A transparent window member 36, which may be of plastic, glass, or other suitable transparent material and attractively curved, includes an outer face 38 having a first peripheral edge 40 encompassing the outer face and a first peripheral ledge 42 recessed with respect to the outer face thereof and projecting outwardly therefrom to a terminal peripheral edge 44.

Viewing FIGS. 2 and 3, a collar 46 is seen to be removably attachable to the cover 28 and includes an outer face 48 having an aperture 50 similar in size and shape to the primary opening 32 of the cover 28. The collar 46 further includes an inner surface 52 having an inner peripheral recess 54 (FIG. 3) adjacent the aperture 50 for capturing reception of the peripheral ledge 42 of the transparent window member 36 between the collar and the cover when attached to the cover. In this manner, the transparent window member 36 is positioned to coextensively overlie the indicia panel 26 on the housing 22. Further, the collar 46 includes a second outer peripheral edge 56 defining the extent of the outer face 48 and a second peripheral ledge 58 recessed with respect to the outer face and projecting outwardly from the outer face 48. The collar displays a second distinctive color.

With reference now to FIGS. 1, 2, and 4, a fixing collar 60 is removably attachable to the cover 28. The fixing collar includes an outer face 62 having an aperture 64 sized and shaped for contiguously encompassing the second outer peripheral edge 56 of the collar 46 when attached to the cover 28. An inner peripheral recess 66 (FIG. 4) is formed into an inner face 68 adjacent the aperture 64 for the capturing reception of the second peripheral ledge 58 of the collar 46 between the fixing collar 60 and the cover 28. The fixing collar 60 displays a third distinctive color.

When the window member 36, the collar 46, and the fixing collar 60 are all assembled on the cover 28, their outer faces 38, 48, and 62, respectively, are all substantially coplanar.

It will also be appreciated that just as the collar 46, the fixing collar 60, and the cover 28 all display distinctive colors, the window member 36 may also display a fourth distinctive color. In this regard, the three or four colors thus displayed may not all be different. That is, it may be desirable for two or more of the components to display the same color. Further, it was earlier mentioned that reference to the term "color" when describing the invention will be taken to include shades of color, texture, and other surface differences of a component such that a viewer can readily distinguish one component from another by its surface appearance. However, it will also be understood as desirable, in certain instances for two or even three of the components to display the same color. What is important is that the user has the ability to "mix and match" the components and to obtain whatever color combination is pleasing to him or her at the moment. The manner of assembling and attaching the components just described will now be explained. The cover 28 is formed with a plurality of similar sized mounting holes 70 (FIG. 2) adjacent the primary opening 32. The collar 46 includes a plurality of associated mounting pegs 72 which project transversely from the inner surface 52 and are fittingly received in the mounting holes 70 when the collar is attached to the cover 28. The mounting holes 70 in the cover 28 are generally circular and each of the mounting pegs 72 is generally shaped as a right truncated cone having a longitudinal axis perpendicular to the inner surface 52. Each mounting peg includes a base end 74 (FIG. 5) at the inner surface 52, a tip end 76 distant from the base end, an outer peripheral surface 78, and a longitudinally extending rib 80 having a depth projecting radially away from the outer peripheral surface which is a maximum at the base end and a minimum at the tip end. When the mounting pegs 72 are inserted into their associated mounting holes, the rib 80 of each mounting peg frictionally engages the hole and provides for an interference fit, the interfering force increasing as the mounting pegs are force into a seating relationship.

The mounting pegs 72 and their associated mounting holes 70 operate in the manner of a key device for properly positioning the collar on the cover and the window member on the collar. More specifically, the key device resides in the arrangement of the plurality of transversely projecting mounting pegs 72 and their associated mounting holes 70 in the cover 28 being so located that the collar can be positioned on the cover in only one mutual orientation and that the window member can be positioned on the collar in only one mutual orientation.

More specifically, as clearly seen in FIG. 3, the aperture 50 is generally rectangular and defined by first and second opposed laterally extending generally parallel window edges 82, 84, respectively, and third and fourth opposed longitudinally extending generally parallel window edges 86, 88, respectively. A pair of the mounting pegs 72 projects at least partly from the inner peripheral recess 54 of the collar 46 at spaced locations adjacent the first window edge 82 and a single one of the mounting pegs projects at least partly from the inner peripheral recess adjacent the second window edge 84. The terminal peripheral edge 44 is contoured to freely receive the base ends 74 of the mounting pegs 72.

Turning now to FIGS. 7 through 11, provision is made for removably mounting the cover 28 on the housing 22. To this end, the fixing collar 60 includes a peripheral flange 90 extending transversely of the outer face 62 and engageable with the cover 28 for attachment to the cover. A plurality of spaced inwardly projecting locking tabs 92, 94 project inwardly from the flange 90, the locking tab 92 from a central location at an uppermost end of the fixing collar and the locking tabs 94 at laterally opposed more central locations (see FIG. 4). Additionally, viewing FIGS. 10 and 11, a frictional male tab 96 projects transversely from the inner face 68 and is generally tear-drop shaped adjacent its free end 98 (see FIGS. 10 and 11).

For its part, the cover 28 includes a rim 100 generally congruent with the peripheral flange 90 of the fixing collar 60 and upstanding from the outer cover face 102 and having a plurality of outwardly facing locking recesses 104, 106. The locking recess 104 is located at an uppermost end of the rim 100 and is associated with the locking tab 92 on the fixing collar 60. The locking recesses 106 are located at laterally opposed more central locations and are associated with the locking tab 94 on the fixing collar 60.

The cover 28 also has an inner surface 108 and a plurality of locking female tabs 110 integral with and extending transversely of the inner surface 104 adjacent a mounting slot 112 distant from the locking recesses 104, 106.

With this construction, when the fixing collar 60 is attached to the cover 28, the peripheral flange 90 is located proximate the rim 100. The peripheral flange 90 is sufficiently flexible to enable the locking tabs 92, 94 to lockingly engage with their associated locking recesses 104, 106, respectively. Additionally, when the male tab 96 projects through the mounting slot 112 in the cover 28 and is lockingly engaged with the plurality of locking female tabs 110.

By reason of the construction just described, a user can readily assemble a telephone 20 with a desirable color scheme. At a later time, whenever desired, the user can disassemble the components, without in any way interfering with the operability of the telephone, and re-assemble it using other components displaying another color scheme. This can be done readily, time and time again, without harming the components and with minimal increase in cost of the unit.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A display system for providing a portable telephone with a plurality of distinctive appearances comprising:

a housing containing components including a plurality of operating buttons for the operation of the telephone and an indicia panel for displaying information concerning operation of the telephone;

a cover coextensive with and overlying said housing and being removably attachable to said housing to enclose said components within said housing, said cover including an outer face having a primary opening for viewing said indicia panel on said housing and a plurality of secondary openings for free reception therethrough of said operating buttons of said housing, said cover having a first distinctive color;

a transparent window member including an outer face having a first peripheral edge encompassing said outer face and a first peripheral ledge recessed with respect to said outer face thereof and projecting outwardly therefrom to a terminal peripheral edge;

a first collar removably attachable to said cover including an outer face having an aperture similar in size and shape to the primary opening of said cover and including an inner surface having an inner peripheral recess adjacent the aperture for capturing reception of said peripheral ledge of said transparent window member between said first collar and said cover when attached to said cover so that said transparent window member overlies coextensively said indicia panel on said housing, said first collar including a second outer peripheral edge defining the extent of said outer face and a second peripheral ledge recessed with respect to said outer face thereof and projecting outwardly therefrom, said collar having a second distinctive color;

a fixing collar removably attachable to said cover, said fixing collar including an outer face having an second aperture sized and shaped for contiguously encompassing said second outer peripheral edge of said first collar when attached to said cover, and having an inner peripheral recess adjacent the second aperture for capturing reception of said second peripheral ledge of said first collar between said fixing collar and said cover, said fixing collar having a third distinctive color.

2. A display system as set forth in claim 1 wherein said outer faces of said window member, of said first collar, and of said fixing collar are all coplanar when assembled on said cover.

3. A display system as set forth in claim 1 wherein said window member has a fourth distinctive color.

4. A display system as set forth in claim 1 wherein said cover has a plurality of mounting holes adjacent said primary opening; and wherein said first collar includes a plurality of mounting pegs projecting transversely from said inner surface and fittingly received in said mounting holes when said first collar is attached to said cover.

5. A display system as set forth in claim 4 wherein the mounting holes in said cover are generally circular; and wherein each of said mounting pegs is generally shaped as a right truncated cone having a longitudinal axis perpendicular to said inner surface and including a base end at said inner surface, a tip end distant from said base end, an outer peripheral surface, and a longitudinally extending rib having a depth projecting radially away from said outer peripheral surface which is a maximum at said base end and a minimum at said tip end.

6. A display system as set forth in claim 1 including:

key means for properly positioning said first collar on said cover and said window member on said first collar.

7. A display system as set forth in claim 6 wherein said key means includes said plurality of transversely projecting mounting pegs and their associated mounting holes in said cover being so located that said first collar can be positioned on said cover in only one mutual orientation and that said window member can be positioned on said first collar in only one mutual orientation.

8. A display system as set forth in claim 7 wherein the aperture is generally rectangular and defined by first and second opposed laterally extending generally parallel window edges and third and fourth opposed longitudinally extending generally parallel window edges; and wherein a pair of said mounting pegs projects at least partly from said inner peripheral recess at spaced locations adjacent said first window edge; and wherein a single one of said mounting pegs projects at least partly from said inner peripheral recess adjacent said second window edge; and wherein said terminal peripheral edge is contoured to freely receive said base ends of said mounting pegs.

9. A display system as set forth in claim 1 including:

means for removably mounting said cover on said housing.

10. A display system as set forth in claim 1 wherein said fixing collar includes:

a peripheral flange extending transversely of said outer face engageable with said cover for attachment thereto;

a plurality of spaced inwardly projecting locking tabs; and a frictional male tab projecting transversely from said inner face;

wherein said cover includes:

a rim generally congruent with said peripheral flange and upstanding from said outer cover face and having a plurality of outwardly facing locking recesses;

an inner surface; and a plurality of locking female tabs integral with and extending transversely of said inner surface adjacent a mounting slot distant from said locking recesses;

whereby when fixing said collar is attached to said cover, said peripheral flange is located proximate said rim, said peripheral flange being sufficiently flexible to enable said locking tabs to lockingly engage with said associated ones of the locking recesses; and whereby said male tab projects through the mounting slot in said cover and is lockingly engaged with said plurality of locking female tabs.

* * * * *